United States Patent [19]

Saito et al.

[11] 4,359,634
[45] Nov. 16, 1982

[54] AUTOMATIC FOCUSING DEVICE

[75] Inventors: Takeo Saito; Shinji Nagaoka; Yuzuru Takazawa; Takashi Segawa, all of Shikawatashi, Japan

[73] Assignee: Seiko Koki Kabushiki Kaisha, Tokyo, Japan

[21] Appl. No.: 143,874

[22] Filed: Apr. 25, 1980

[51] Int. Cl.³ .............................................. G01J 1/20
[52] U.S. Cl. ...................................... 250/201; 354/25
[58] Field of Search ....................... 250/201, 204, 209; 354/25; 356/1, 4

[56] References Cited

U.S. PATENT DOCUMENTS

| | | | |
|---|---|---|---|
| 4,010,479 | 3/1977 | Nobusawa | 354/25 |
| 4,135,815 | 1/1979 | Masunaga et al. | 356/4 |
| 4,207,461 | 6/1980 | Wilwerding | 250/204 |
| 4,284,335 | 8/1981 | Takemae et al. | 250/201 |

Primary Examiner—David C. Nelms
Attorney, Agent, or Firm—Robert E. Burns; Emmanuel J. Lobato, Sr.; Bruce L. Adams

[57] ABSTRACT

An automatic focusing device controls the setting of an actuating member to effect automatic focusing of a camera lens and is used in conjunction with a focus detecting unit which produces a focus detection signal corresponding to the object distance by photoelectrically comparing optical images transmitted by stationary and movable mirror systems. The automatic focusing device comprises pulse generating circuitry for generating pulses at a fixed repetition rate, a first counting circuit for counting pulses such that the number of pulses counted is a function of the angle of displacement of a movable mirror of the movable mirror system during a range scanning operation, and a second counting circuit connected to receive and memorize the pulse count counted by the first counting circuit when a focus detection signal is produced by the focus detecting unit and operative to count pulses such that the number of pulses counted is a function of the extent of movement of the actuating member. A detector detects when the pulse count counted by the second counting circuit reaches a predetermined count and produces a corresponding output signal which is used to terminate the movement of the actuating member to thereby effect focusing of the camera lens.

7 Claims, 10 Drawing Figures

AUTOMATIC FOCUSING DEVICE

BACKGROUND OF THE INVENTION

This invention relates to an automatic focusing device for a camera which is capable of adjusting the lens to a position corresponding to an object distance by means of a focus detection signal detected by an automatic focusing detecting device which automatically detects the focus position by scanning the range utilizing the principle of the coincident type range finder.

The automatic focus detecting device has a stationary mirror and a movable mirror. During the course of the scanning operation by the movable mirror, a peak correlative signal is produced when the optical information transmitted through the stationary mirror and the optical information transmitted by the movable mirror coincide. The angle of rotation of the movable mirror with respect to the direction of the incident light corresponds to the object distance. There have heretofore been introduced various methods of adjusting the lens to a fixed position employing the focus detection signal produced through procedure as hereinbefore described. In one of the conventional methods, a potentiometer is coupled with a movable mirror which performs a scanning operation from a minimum range through an infinite range, the resistance of the potentiometer when a peak correlative signal is produced during the scanning operation is memorized by a condenser or the like and the movable mirror and the potentiometer are uncoupled at the completion of the scanning operation of the movable mirror. The potentiometer is then coupled with an actuating member which drives the potentiometer in the reverse direction and the movement of the actuating member is interrupted when the potentiometer provides a resistance equivalent to the previously memorized resistance, then the lens is adjusted to a position corresponding to the position of the actuating member.

According to this conventional method, the movable mirror is required to rotate only in one direction during the scanning operation, furthermore, a single potentiometer serves both for range scanning and for range setting, thus providing considerably improved automatic focusing.

However, the method requires a reciprocating motion of the potentiometer requiring a sophisticated mechanism, and moreover, the durability and the stepping resistance of the potentiometer cause extra problems requiring high reliability.

In addition to those structural problems, stepless range adjustment is impossible by the actuating member due to mechanical restrictions resulting in stepped range adjusting. Consequently, stepless and accurate focus detection by the scanning operation of the movable mirror results finally in the stepped lens adjustment, therefore, analogue range adjustment is not always advisable.

SUMMARY OF THE INVENTION

An object of the present invention is to eliminate the aforementioned disadvantages and to an automatic focusing device provided having a focus detecting unit which develops a focus detection signal corresponding to the object distance by photoelectrically comparing optical images transmitted through a stationary mirror system and a movable mirror system, the device comprising a pulse emitter which emits a pulse signal corresponding to an angle of rotation of the movable mirror of the movable mirror system, a first counting circuit which counts the pulses emitted by the pulse emitter, and means operable to write a pulse count counted by the first counting circuit in a second counting circuit and transmit pulses corresponding to the movement of an actuating member when a focus detection signal is sent forth by said focus detecting unit, and interrupt the movement of the actuating member when the pulse count memorized by the second counting circuit and the pulse count corresponding to the movement of the actuating member constitute a fixed relationship.

DETAILED DESCRIPTION OF THE PREFERRED EMBODIMENTS

Figure 1:
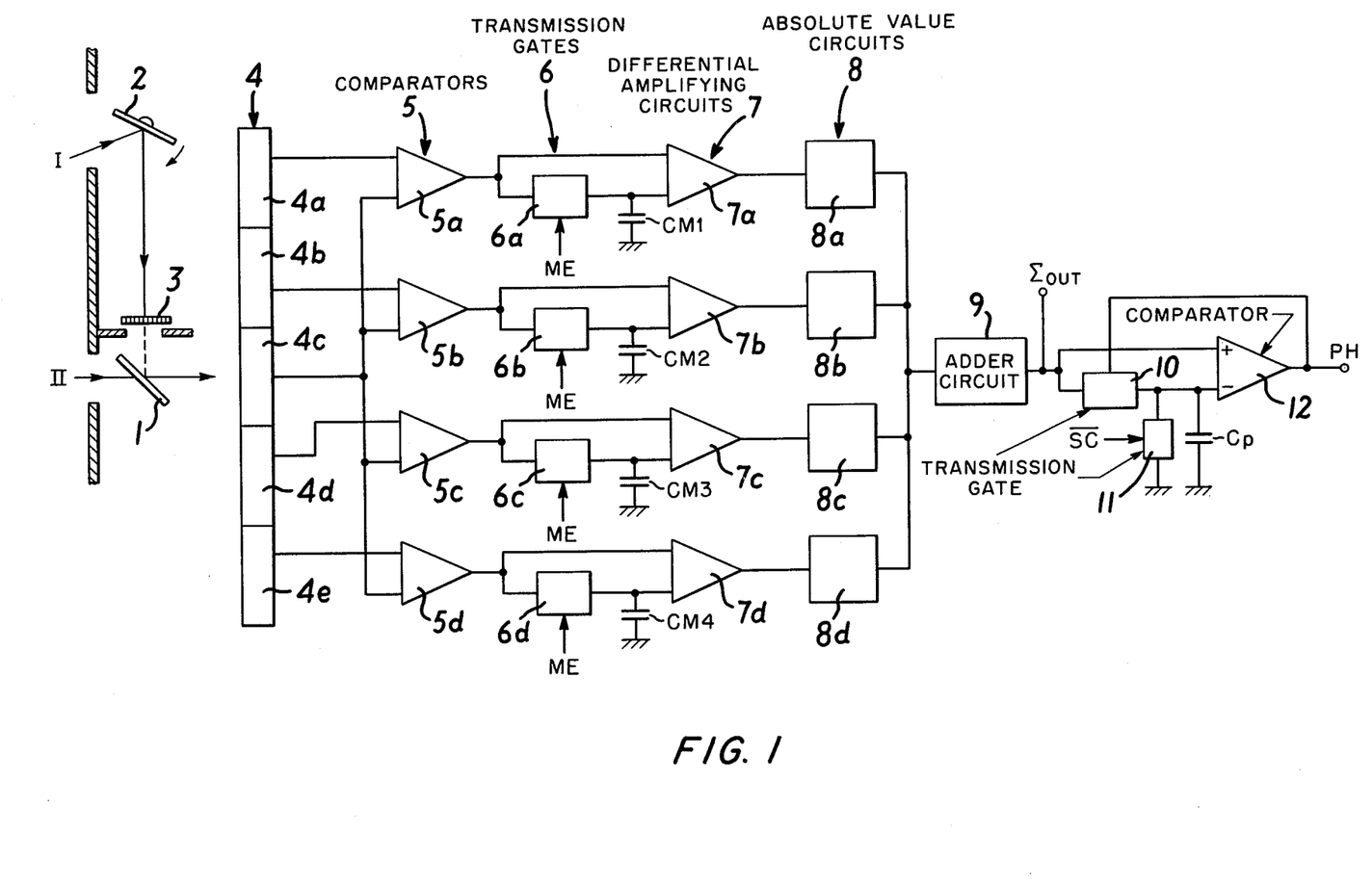
FIG. 1 is a block diagram of a range measuring optical system and focus detecting circuit for use with the automatic focusing device of the present invention.
Figure 2:
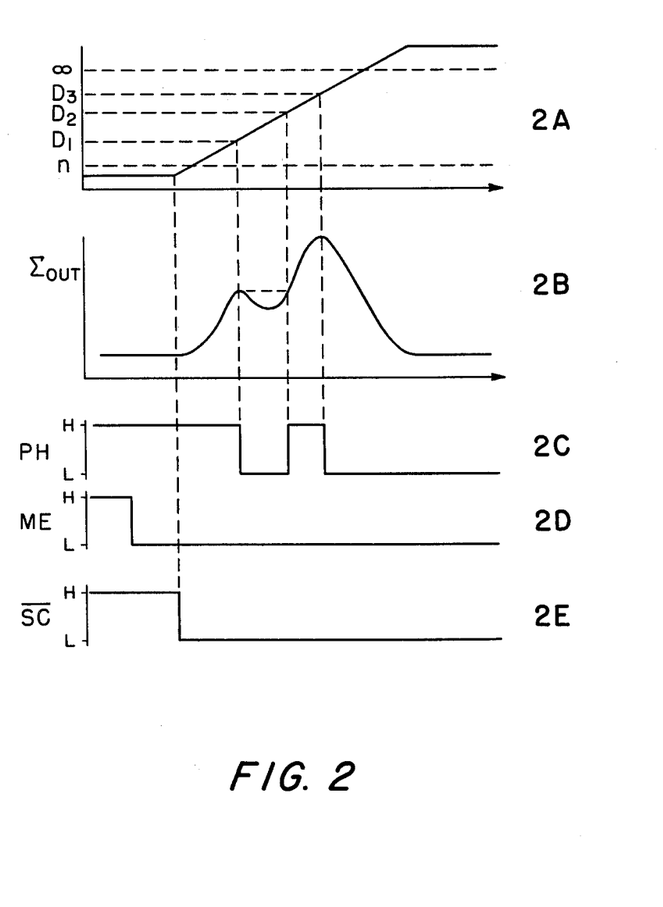
FIGS. 2A-2E are waveforms showing the operational relationship between different parts of the focus detecting device, FIG. 2A indicating the operation of the movable mirror (2), FIG. 2B indicating the output signal of the adder circuit (9), FIG. 2C indicating the output signal of the comparator (12), FIG. 2D showing the control signal of the transmission gate (6) and FIG. 2E indicating the control signal of the transmission gate (11)

FIG. 1 is a block diagram illustrating a preferred embodiment of a range measuring optical system and a focus detecting circuit applicable to an automatic focusing device according to the present invention and FIG. 2 illustrates waveforms of the principal signals produced by the circuit of FIG. 1. A detailed description of the range measuring optical system and focus detecting circuit are described in Japanese Patent Application No. 52-138740 and corresponding U.S. patent application Ser. No. 961,742.

Referring to FIG. 1, reference numerals indicate (1): a half mirror, (2): a movable mirror, (3): a sector for opening and closing the optical path between the half mirror (1) and the movable mirror (2) and (4): an array of photoelectric elements consisting of five photoelectric elements (4a), (4b), (4c), (4d) and (4e) and disposed behind the half mirror (1). When the optical path which includes the moveable mirror is blocked by the sector (3), the incident light (II) from an object to be photographed reaches the array of photoelectric elements (4) penetrating through the half mirror (1). When the sector (3) is retracted from the optical path the incident light (II) and the incident light (I) also from the object but reflected by the movable mirror (2) both reach the array of photoelectric elements (4). Each separate photoelectric element of the array of photoelectric elements (4) is connected to a corresponding comparator of an array of comparators (5) as illustrated. The output terminals of the comparators (5) are connected to respective first input terminals of differential amplifying circuits (7) and to respective second input terminals of the differential amplifying circuits (7) through respective transmission gates (6). A condenser (CM) is connected to each second input terminal of the differential amplifying circuits (7). The output terminals of the differential amplifying circuits (7) are connected to respective absolute value circuits (8). All the output terminals of the absolute value circuits (8a), (8b), (8c) and (8d) are connected to an input terminal of an adder circuit (9). The output terminal of the adder circuit (9) is connected to a peak detecting circuit consisting of a comparator (12), transmission gates (10) and (11) and a condenser (CP).

The output signal (Σout) of the adder circuit (9) is applied to an inversion terminal through the non-inversion input terminal of the comparator (12) and the transmission gate (10). The condenser (CP) and the transmission gate (11) are connected to the inversion input terminal of the comparator (12). A control signal ($\overline{SC}$) is applied to the transmission gate (11). The output terminal of the comparator (12) is connected to the control terminal of the transmission gate (11).

The mode of operation of the device from the start of rotation of the movable mirror through the detection of a focus detection signal will be described referring to FIGS. 1 and 2. In FIG. 2, the waveforms (2A), (2B), (2C), (2D) and (2E) indicate the operation of the movable mirror (2), the output signal (Σout) of the adder circuit (9), the output signal (PH) of the comparator (12), the control signal (ME) of the transmission gate (6) and the control signal ($\overline{SC}$) of the transmission gate (11), respectively.

Before the shutter releasing operation, the sector (3) intercepts the optical path of the movable mirror system. The control signal (ME) of each of the transmission gates (6) and the control signal ($\overline{SC}$) of the transmission gate (11) are in "H" level and in continuity. The transmission gate (10) also is in continuity as the output (PH) of the comparator (12) is adjusted to be in "H" level when an equal voltage is applied to the input terminal. The incident light (II) from an object to be photographed penetrates through the half mirror (1) and reaches the photoelectric elements (4). The respective photoelectric outputs produced by the photoelectric elements (4a)–(4e) are compared by the comparators (5) with the photoelectric output of the photoelectric element (4c) used as a reference output, then the signals are sent through the respective transmission gates (6a)–(6d) and memorized by the respective condensers (CM1)–(CM4).

As the shutter releasing member is depressed, the control signal (ME) changes to "L" level, so that a light distribution information transmitted through the stationary light path is memorized by the condensers (CM). As the shutter releasing member is depressed further, the sector (3) is retracted from the movable light path, then the photoelectric elements (4) receive composite light composed of the incident light (II) transmitted penetrating through the half mirror (1) and the incident light (I) reflected by the movable mirror (2). The movable mirror is turned clockwise as indicated by an arrow after the sector (3) has been retracted. The turning of the movable mirror (2) covers the minimum range (the nearest possible object distance) or nearer over the infinite range (the face of the mirror is inclined against the direction of the incident light (I) at an angle of 45 degrees) or further. Simultaneously with the start of the movable mirror (2), the transmission gate (11) is opened as the control signal ($\overline{SC}$) thereof changes to "L" level. Consequently, the output signal (Σout) of the adder circuit (9) is applied to the condenser (CP). As the movable mirror (2) is turned further, the photoelectric outputs of the photoelectric elements (4) are compared with the reference output of the photoelectric element (4c), by the comparators (5a)–(5d), then applied to the respective differential amplifying circuits (7). Light information from the stationary optical system has previously been applied to the respective first input terminals of the differential amplifying circuits (7), therefore, the output signals are compared by the differential amplifying circuits (7), then added by the adder circuit (9) after passing through the respective absolute value circuits (8a)–(8d). The output signal of the adder circuit (9) is a correlative signal correlating between the previously memorized light distribution information from the stationary optical system and the composite light distribution information composed of the light distribution information from the stationary optical system and the light distribution information from the movable optical system.

The output signal (Σout) of the adder circuit (9) varies as indicated in FIG. 2-2B, and the "+" input of the comparator (12) becomes lower than the "−" input as the gradient of the (Σout) becomes negative when the movable mirror passes (D1) so that the output (PH) is inverted to "L" level and the transmission gate (10) is opened. Therefore, the condenser (CP) memorizes the output signal of the adder circuit (9) produced with the movable mirror (2) at the position (D1). As the movable mirror (2) is turned still further passing a position (D2), the comparator output (PH) returns to "H" level as the voltage of the output signal (Σout) becomes higher than the voltage memorized with the movable mirror (2) at the positon (D1). The output signal (PH) is inverted to "L" level again after the movable mirror (2) has reached and passed a little beyond a position (D3). The output signal (PH) of the comparator is maintained at "L" level as the signal (Σout) remains under the output signal produced with the movable mirror (2) at the position (D3) if the movable mirror (2) has turned to the position corresponding to the infinite range. When the light distribution information of the image memorized by the condenser (CM) during the turning of the movable mirror (2) and the light distribution information of the image produced by the turning of the movable mirror (2) are similar distributions, the signal (PH) is inverted from "H" level to "L" level to produce a focus detection signal at the peak of the signal (Σout), which corresponds to the position (D3) of the movable mirror (2) corresponding to the object distance, that is, the position of the movable mirror where the signal (PH) is inverted to "L" level for the last time corresponds to the object distance.

It is to be understood that the present invention is not limited to the preferred embodiment of FIG. 1, but may be embodied in various modified forms, for instance, the light information from the stationary mirror and the light information from the movable mirror may be received by separate photoelectric elements and the output signals thereof may be converted to the correlative signal (Σout) by a well-known focus detecting module. In this case, the transmission gate control signal (ME) and, if not required particularly, the signal (SC) are omitted.

In FIG. 1, the output signal (Σout) of the adder circuit (9) is short-circuited to the earth through the transmission gates (10) and (11) before the sector (3) is retracted from the optical path and applied to the peak detecting circuit after the sector (3) has been fully retracted because it is apparent that the output signal (Σout) is maximized while the sector (3) is intercepting the optical path and even during the course of retraction of the sector (3), the output signal (Σout) has a possibility to become higher than the output signal (Σout) produced during the following scanning operation of the movable mirror, thus performing erroneous peak detection.

Figure 3:
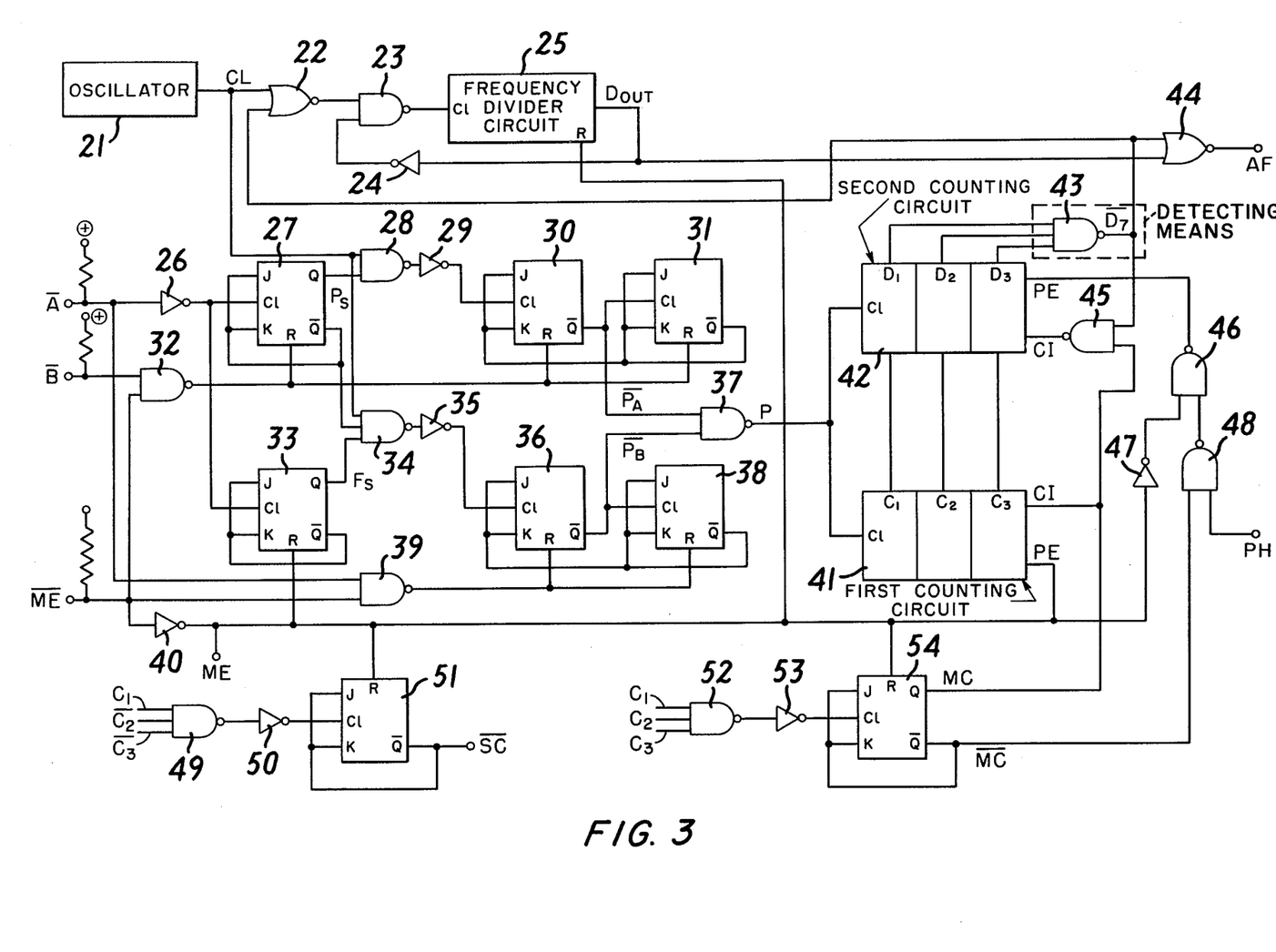
FIG. 3 is a block diagram of a preferred embodiment of the focusing device according to the present invention.

FIG. 3 is a block diagram of an automatic focusing device of the present invention for adjusting the lens to a fixed position by using the focus detection signal obtained by the focus detecting device as described referring to FIG. 1.

Figure 4:
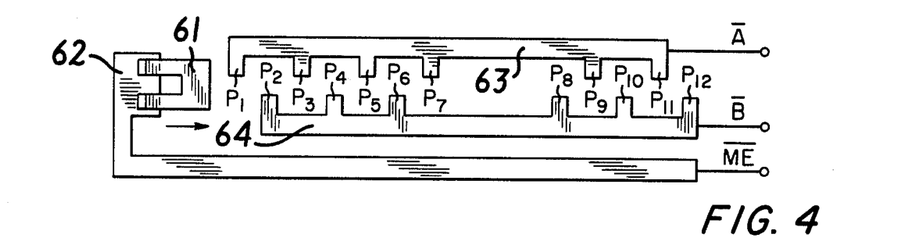
FIG. 4 is a switching formation for the embodiment of FIG. 3.

FIG. 4 illustrates a preferred embodiment of the switch according to the present invention applied to the embodiment of FIG. 3.

Figure 5:
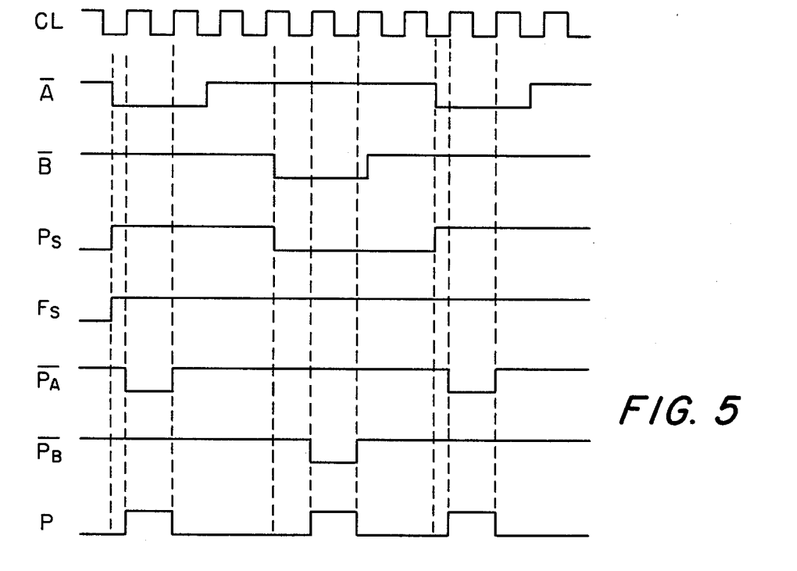
FIG. 5 is a waveform chart of principal signals of the focusing device, and FIG. 6 also is a waveform chart of principal signals of the focusing device.
Figure 6:
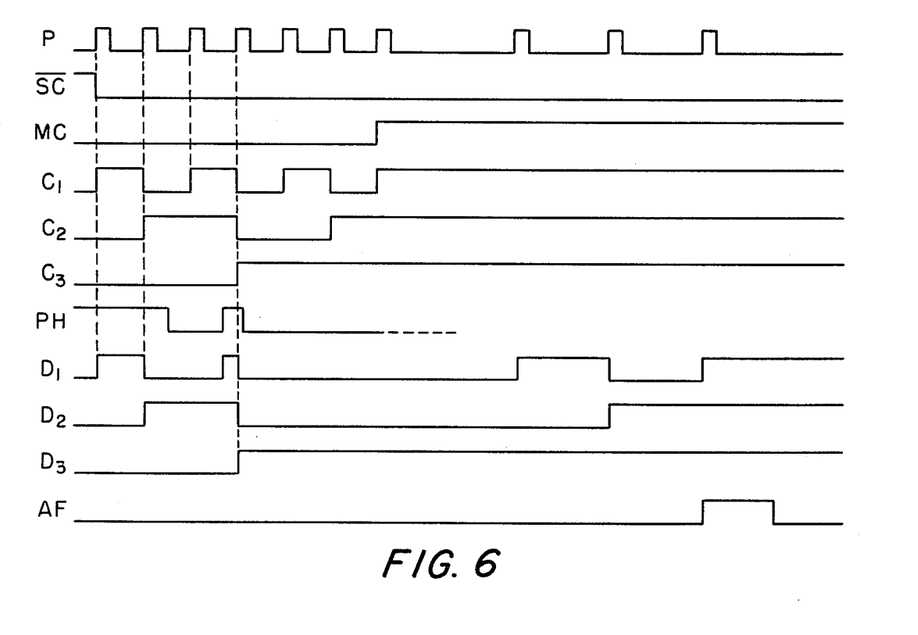

FIGS. 5 and 6 illustrate waveform of signals used for the description of the embodiment of FIG. 3.

Referring first to FIG. 4, a contact plate (61) is moved from left to right as shown by an arrow. Contact points (62), (63) and (64) are connected to terminals $(\overline{ME})$, $(\overline{A})$ and $(\overline{B})$, respectively. The contact plate (61) is kept at an earth potential, so that when, with the contact point (62) is in contact with the contact plate (61), for instance, the terminal $(\overline{ME})$ is inverted to "L" level. The contact point (63) has plural contact points (P1), (P3), . . . (P11). The contact point (64) also has plural contact points (P2), (P4), . . . and (P12).

The contact plate (61) is coupled with an actuating member, not shown, which starts moving at the depression of the shutter releasing member. During the first half cycle of movement of the actuating member, the sector (3) of FIG. 1 is retracted from the optical path and the movable mirror is turned being interlocked with the movement of the actuating member. During the latter half cycle of movement of the actuating member, the actuating member comes in contact with a range stopper, not shown, and turns the range stopper. When the actuating member reaches a position corresponding to an angle of rotation of the movable mirror where a focus detection signal is produced, a signal (AF), which will be described later referring to FIG. 3, is produced whereby an electromagnet, not shown, is actuated to stop the turning of the range stopper, consequently the actuating member also is stopped. Focus adjustment of the lens follows thereafter with a focus adjusting member, not shown, coming in contact with the range stopper. At the beginning of the range scanning operation by the movable mirror (2), the contact plate (61) is in contact with the contact plate (62), then makes contact sequentially with the contact points (P1), (P2), (P3), . . . corresponding to the angle of turning of the movable mirror (2) with the movement of the actuating member. This preferred embodiment is designed so as to adjust the lens to five focus adjusting positions between the minimum range and the infinite range. The contact plate (61) makes contact with the contact points (P1), (P2), (P3), (P4), (P5), (P6) and (P7) with the movable mirror (2) turned to angles corresponding to a range within the minimum range, the minimum range, a range X1, a range X2, a range X3, the infinite range and a range a little further than the infinite range, respectively. The movable mirror (2) is stopped when it is turned for an angle corresponding to the range a little further than the infinite range. Providing that the range stopper is stopped after successive movement of the actuating member with the contact plate (61) in contact with one of the contact points (P8), (P9), (P10), (P11) and (P12), then the lens is adjusted to focus adjusting positions corresponding to the infinite range, the range X3, the range X2, the range X1 and the minimum range, respectively.

In FIG. 3, an oscillator (21) emits clock pulses (CL) of a fixed frequency. A first counting circuit (41) and a second counting circuit (42) are comprised of presettable upcounters (designated simply as 'counter' hereinafter). Normally, terminals $(\overline{A})$, $(\overline{B})$ and $(\overline{ME})$ are in the "H" level as they are connected to the positive terminal of a power source as shown in FIG. 3. "H" level and "L" level will be abbreviated as "H" and "L" hereinafter. The signals of the terminals (ME), $(\overline{SC})$ and (PH) are in the same level as a control terminal for providing after explained in FIG. 1. The terminal (AF) functions as a control signal for controlling the electromagnet (not shown) which controls the range stopper. Normally, the terminal (AF) is in "L" and inverted to "H" after an output signal $(\overline{D7})$ of a NAND circuit (43) became "L" till an output signal (Dout) of a frequency divider circuit (25) becomes "H", during which the terminal (AF) emits a control signal to cut off the current to the electromagnet.

In operation, a power switch, not shown, is closed and every circuit is charged as the shutter releasing member is depressed. At this moment, the terminal $(\overline{ME})$ is in "L" as the contact plate (61) is in contact with the contact point (62) so that the terminal (ME) becomes "H" through an inverter (40), JK flip flops (33), (51) and (54) are reset and the outputs $(\overline{Q})$ and (Q) become "H" and "L", respectively. The JK flip flop will be abbreviated as FF hereinafter. An "H" signal is applied to the reset terminals of the FF (36) and (38) through the NAND circuit (39) and to the reset terminals of the FF (27), (30) and (31) through the NAND circuit (32) so that these FF are reset. The write terminal (PE) of a counter (41) is in "H" and the count "O" is written. Accordingly, all the outputs (C1), (C2) and (C3) are "L" and counting by a CARRY IN terminal (CI) is possible when an output signal (P) is emitted by the NAND circuit (37) as the output (Q), that is a MC signal, of the FF (54) is in "L".

The terminal (PE) of the counter (42) becomes "H" and writes the contents of the counter (41) as the terminal (ME) is applying an "L" signal to the NAND circuit (46) through an inverter (47). Accordingly, all the outputs (D1), (D2) and (D3) become "L" so that the output $(\overline{D7})$ of the NAND circuit (43) becomes "H" and is transmitted to NOR circuit (22), therefore, the clock pulse (CL) emitted by the oscillator (21) is not sent to the frequency divider circuit (25). The terminal (CI) of the counter (42) does not count before the pulse (P) is inverted to "H" by the signal (MC) as "L" of the signal (MC) is inverted to "H" through a NAND circuit (45).

When the contact plate (61) separates from the contact point (62) with the movement of the actuating member, the terminal $(\overline{ME})$ becomes "H", therefore, the signal (ME) becomes "L" and the reset of every FF and the frequency divider circuit (25) is cancelled, while the focus detecting circuit memorizes the light information from the stationary mirror system.

With full retraction of the sector (3) from the optical path thereafter, simultaneously with the start of turning of the movable mirror (2), the contact plate (61) comes in contact with the contact point (P1) to make the terminal ($\overline{A}$) "L". Consequently, an "H" signal is applied to the FF (27) through the inverter (26) to make the signal (Ps), that is the output (Q), "H" and latches by the signal ($\overline{Q}$). As the signal (Ps) is "H", the clock pulse (CL) makes the output ($\overline{Q}$) of the FF (30) "L" through the NAND (28) and the inverter (29). At the following rise of the clock pulse (CL), the output ($\overline{Q}$) of the FF (30) becomes "H" again and the output ($\overline{Q}$) of the FF (31) becomes "L", then the FF (30) and (31) are latched. Inversion of the clock pulse (CL) to "L" and the terminal ($\overline{A}$) (the same with the terminal ($\overline{B}$)) to "L" are not synchronous, therefore, the rise of the signal ($\overline{PA}$) obtained from the output ($\overline{Q}$) of the FF (30) is synchronized with the rise of the clock pulse (CL) after the signal (Ps) becomes "H" and the pulse width thereof corresponds to one cycle of the clock pulse (CL). The signal ($\overline{PB}$), that is the output ($\overline{Q}$) of a FF, is maintained in "H" as the FF (36) and (38) are reset again through the NAND (39) when the signal ($\overline{A}$) becomes "L", therefore, the signal ($\overline{PA}$) is changed to the signal (P) through the NAND (37) and sent to the counter (41) so that the output (C1) of the counter (41) becomes "H". Consequently, all the input terminals of the NAND (49) becomes "H" making the signal ($\overline{SC}$), that is the outpt ($\overline{Q}$) of the FF (51), "L", then the peak detecting circuit is started. As the movable mirror (2) is turned further, with the contact plate (61) in contact with the contact point (P2), the terminal ($\overline{B}$) becomes "L" to reset the FF (27), (30) and (31). The reset of the FF (36) and (38) is cancelled when the contact plate (61) separates from the contact point (P1). The signal (Fs), that is the output (Q) of the FF (33), has been inverted to "H" since the terminal ($\overline{A}$) became "L" in the early phase and is maintained in "H" so that the clock pulse (CL) is applied to the FF (36) through the NAND (34) and the inverter (35), the signal ($\overline{PB}$) is emitted in the same manner as with the signal ($\overline{PA}$) from the output ($\overline{Q}$) of the FF (36), changed to the signal (P) through the NAND (37) and sent to the counter (41). FIG. 5 illustrates respective waveform of the signals corresponding to the position of the contact plate (61) as far as the position after the contact plate (61) has passed the contact point (P3).

During the successive movement of the contact plate (61), the pulses (P) corresponding to the angle of turning of the movable mirror (2) are sent to the counter (41) in the same manner every time the contact plate (61) makes contact with one of those contact points. The pulse count counted by the counter (41) corresponds to the angle of turning of the movable mirror (2). The contents of the counter (41) are written in the counter (42) as the terminal (PE) of the counter (42) is inverted to "H" through the NAND (48) and (46) every time when the peak detection signal (PH) becomes "H".

Referring to FIG. 6, explanation will be made on the procedure of range setting using the focus detection signal produced during the turning of the movable mirror (2).

Supposing that the object to be photographed is at the range X2 and that the signal (PH) as shown in FIG. 6 is the corresponding signal, the counter (42) counts a count 2 when the contact plate (61) comes in contact with the contact point (P2). As the movable mirror is turned further and the contact plate (61) comes in contact with the contact point (P4), the contents of the counter (41) are written again in the counter (42), therefore, the counter (42) counts a count 4. The outputs (D1), (D2) and (D3) of the counter (42) remain in "L", "L" and "H", respectively, as there is no further writing thereafter. As the movable mirror is turned further to a position past the position corresponding to the infinite range with the contact plate (61) in contact with the contact point (P7), "H" is applied to the input terminals of the NAND (52) as all the outputs (C1), (C2) and (C3) of the counter (41) become "H" and the output of the NAND (52) is applied to the FF (54) through the inverter (53) so that the output of the FF (54) is inverted and latched. Consequently, the terminal (CI) of the counter (41) becomes "H" and the signal (P) obtained from the NAND (37) thereafter is not counted. The terminal (CI) of the counter (42) becomes "L" and is permitted to count the signal (P). The signal (PH) applied to the terminal (PE) is cut out off as the signal ($\overline{MC}$) becomes "L" and the terminal (PE) becomes "L" so that the writing of the contents of the counter (41) is not permitted thereafter. Every time when the contact plate (61) makes contact with the contact points (P8) and (P9) according to the movement of the actuating member, additional signals (P) are counted by the counter (42). The counter (42) counts a count 7 when the contact plate (61) comes in contact with the contact point (P10) so that the outputs (D1), (D2) and (D3) of the counter (42) become "H" and the output ($\overline{D7}$) of the NAND (43) becomes "L". The signals (P) are not counted thereafter as the terminal (CI) of the counter (42) becomes "H" when the output ($\overline{D7}$) becomes "L". The NAND gate (43) functions as a detector for detecting when the pulse count counted by the counter (42) reaches a predetermined count which, in this embodiment, is the numerical complement of the memorized pulse count from the counter (41). As the "L" signal of the output ($\overline{D7}$) is applied to the NOR (22), the clock pulse (CL) is applied to the frequency divider circuit (25) by the NOR (22) and the NAND (23) and divided. As the signal (D7) is applied also to the NOR (44), the output signal (AF) of the NOR (44) becomes "H", which is transmitted to the electromagnet to cut out the electromagnet, thus stopping the range stopper and the actuating member, consequently, the focus adjusting member is adjusted to a position corresponding to the range X2.

The signal (AF) becomes "L" again when the output (D out) of the frequency divider circuit (25) becomes "H", then the electromagnet is excited again. The electromagnet is re-excited for the purpose of, for instance, employing the same electromagnet for carrying out the focus adjustment and shutter operation to be performed thereafter.

As described above, in this embodiment of the present invention, range setting (focus adjustment) is performed when the pulse count memorized by the counter (42) during the turning of the movable mirror and the pulse count obtained by the movement of the actuating member become the complement of seven with each other. Accordingly, if the count memorized by the counter (42) is two, range setting is performed when the pulse count obtained by the movement of the actuating member becomes five, that is when the contact plate (61) comes in contact with the contact point (P12).

Although the invention has been described regarding a preferred embodiment capable of setting the range in five steps, it is to be understood that the number of the range setting steps may be changed at the discretion of the manufacturer. Furthermore, although presettable counters are used for the first and second counting circuits, it is apparent that a binary counter or the like may be used as to the first counting circuit and the counter for the second counting circuit is not limited to a presettable counter, but any counter having the same function may be used.

The frequency of the clock pulse of the preferred embodiment is determined by considering mainly the scanning time of the movable mirror, and any frequency is applicable as long as the frequency is substantially higher than that of the preferred embodiment.

Although the pulse count memorized by the second counter and the pulse count additionally counted by the movement of the actuating member for call are in a complementary relationship, it is not limited to complementary relationship. In a modification, an additional third counting circuit may be provided in a circuit arranged to apply the signal (P) synchronously with the changeover of the signal (MC) to the third counting circuit wherein the pulse from the movable mirror is memorized by the second counting circuit and the pulse from the actuating member is memorized by the third counting circuit, and when the respective pulse counts of the second and third counting circuits coincide, the range setting is performed. In this system, the direction of turning of the range stopper is reversed relative to that of the complementary system.

In the case of the pulse coincidence system as described above, the signal ($\overline{SC}$) may be eliminated or the signal (P) of a dummy may be added in calling.

It is obvious from what has been described hereinbefore that the present invention is capable of performing digital circuit processing wherein a pulse corresponding to the angle of turning of a movable mirror is generated and the generated pulse is counted by a first counting circuit, the contents of the first counting circuit are memorized by a second counting circuit at the generation of a focus detection signal, then the memorized pulse count is called in a predetermined relationship by a pulse generated by the movement of an actuating member, requires simple circuit and switching formation as the same pulse generating circuit and the same switch function in the scanning operation of a mirror and in the range setting operation using signals from two separate systems, thus providing an exceedingly reliable focusing device.

We claim:

1. An automatic focusing device for use with a focus detecting unit which transmits a focus detection signal corresponding to the object distance by photoelectrically comparing optical images transmitted through a stationary mirror system having a stationary mirror and a movable mirror system having a movable mirror comprising: pulse generating means for generating a pulse signal corresponding to an angle of rotation of the movable mirror of the movable mirror system; first counting means for counting the pulses generated by said pulse generating means; second counting means receptive of the pulse count counted by said first counting means when a focus detection signal is generated by said focus detecting unit for counting the pulses generated by said pulse generating means and generating a pulse signal corresponding to the movement of an actuating means; detecting means for detecting when the pulse count counted by said second counting means reaches a fixed count and producing a corresponding output; and control means for interrupting the movement of the actuating means in accordance with the output of said detecting means.

2. An automatic focusing device as set forth in claim 1; wherein the detecting means includes means for detecting when the pulse count of said second counting means comes to zero by counting down the pulse signal corresponding to the movement of said actuating means.

3. An automatic focusing device as set forth in claim 1; wherein the pulse generating means generates pulse signals with two groups of contact points.

4. An automatic focusing device as set forth in claim 1; including signal generating means for generating a start signal, distance signals, and a mode change signal between the pulse signal corresponding to the angle of rotation of the movable mirror and the pulse signal corresponding to the actuating means.

5. An automatic focusing device for controlling the setting of an actuating member to effect automatic focusing of a camera lens and useable in conjunction with a focus detecting unit which produces a focus detection signal corresponding to the object distance by photoelectrically comparing optical images transmitted by a stationary mirror system having a stationary mirror and a movable mirror system having a movable scanning mirror, the automatic focusing device comprising: pulse generating means for generating pulses at a fixed repetition rate; first counting means for counting pulses generated by the pulse generating means such that the number of pulses counted is a function of the angle of displacement of the movable mirror during a range scanning operation; second counting means connected to receive and memorize the pulse count counted by the first counting means when a focus detection signal is produced by the focus detecting unit and for counting pulses generated by the pulse generating means such that the number of pulses counted is a function of the extent of movement of the actuating member; detecting means for detecting when the pulse count counted by the second counting means reaches a predetermined count and producing a corresponding output signal; and control means responsive to the output signal from the detecting means for effecting the termination of movement of the actuating member thereby enabling the automatic focusing of the camera lens.

6. An automatic focusing device according to claim 5; wherein the detecting means comprises means for detecting when the pulse count counted by the second counting means reaches a predetermined count which is the numerical complement of the memorized pulse count from the first counting means with respect to a predetermined reference count number.

7. An automatic focusing device according to claim 5 or 6; wherein the pulse generating means comprises an oscillator for generating high frequency pulses at a fixed repetition rate, and circuit means receptive of the high frequency pulses for digitally processing the pulses in accordance with the angle of displacement of the movable mirror during range scanning and in accordance with the extent of movement of the actuating member and applying processed pulses to the first and second counting means.

* * * * *

UNITED STATES PATENT AND TRADEMARK OFFICE
CERTIFICATE OF CORRECTION

PATENT NO. : 4,359,634

DATED : November 16, 1982

INVENTOR(S) : Takeo Saito; Shinji Nagaoka; Yuzuru Takazawa; and Takashi Segawa

It is certified that error appears in the above-identified patent and that said Letters Patent is hereby corrected as shown below:

In the heading, beneath the line reading

"[22] Filed: April 25, 1980"

insert the lines

--[30] Foreign Application Priority Data
April 28, 1979[JP] Japan.....54-52860--.

Signed and Sealed this

Sixth Day of December 1983

[SEAL]

Attest:

GERALD J. MOSSINGHOFF

Attesting Officer

Commissioner of Patents and Trademarks